US008873486B2

(12) United States Patent
Moulsley et al.

(10) Patent No.: US 8,873,486 B2
(45) Date of Patent: Oct. 28, 2014

(54) METHOD FOR COMMUNICATING IN A MOBILE NETWORK

(75) Inventors: Timothy Moulsley, Caterham (GB); Milos Tesanovic, Cambridge (GB)

(73) Assignees: Koninklijke Philips N.V., Eindhoven (NL); Sharp Kabushiki Kaisha, Osaka (JP)

( * ) Notice: Subject to any disclaimer, the term of this patent is extended or adjusted under 35 U.S.C. 154(b) by 122 days.

(21) Appl. No.: 13/379,866

(22) PCT Filed: Jun. 23, 2010

(86) PCT No.: PCT/IB2010/052643
§ 371 (c)(1),
(2), (4) Date: Dec. 21, 2011

(87) PCT Pub. No.: WO2010/150133
PCT Pub. Date: Dec. 29, 2010

(65) Prior Publication Data
US 2012/0106494 A1 May 3, 2012

(30) Foreign Application Priority Data
Jun. 25, 2009 (EP) .................................... 09163825

(51) Int. Cl.
*H04W 4/00* (2009.01)
(52) U.S. Cl.
USPC .......................................... 370/329; 455/450
(58) Field of Classification Search
None
See application file for complete search history.

(56) References Cited

U.S. PATENT DOCUMENTS

| 2010/0260124 | A1* | 10/2010 | Noshio et al. ................. 370/329 |
| 2010/0279628 | A1* | 11/2010 | Love et al. ..................... 455/70 |
| 2011/0051681 | A1* | 3/2011 | Ahn et al. ...................... 370/330 |
| 2012/0039170 | A1* | 2/2012 | Ball et al. ...................... 370/230 |
| 2013/0077587 | A1 | 3/2013 | Kwak et al. |

FOREIGN PATENT DOCUMENTS

| CN | 101404526 A | 4/2009 |
| EP | 1988667 A2 | 5/2008 |
| WO | WO2009057283 | * 5/2009 |

OTHER PUBLICATIONS

Philips: "PDCCH Search Space for Carrier Aggregation"; 3GPP TSG RAN WG1 Meeting 57bis; R1-092348, 3rd Generation Partnership Project (3GPP), Jun. 29-Jul. 3, 2009, Los Angeles, USA, 5 Page Document.
ZTE: "Primary and Secondary PDCCH Design for LTE-A"; 3GPP TSG-RAN WG1 Meeting #57, R1-091707, May 4-8, 2009, San Francisco, USA, 12 Page Document.
NTT Docomo: "Pdcch Allocation Based on Hashing Function Generation Method for PDCCH Blind Decoding"; 3GPP TSG RAN WG1 Meeting #52bis, R1-081406, Mar. 31-Apr. 4, 2008, Shenzhen, China, 4 Page Document.

(Continued)

*Primary Examiner* — Mohammad Adhami

(57) ABSTRACT

The present invention relates to a method for communicating between a primary station and a plurality of secondary stations, comprising (a) the primary station configuring a secondary station to search on a first channel at least one of a plurality of search spaces having a first structure, said first structure consisting of at least a first number of resource sets, where at least one resource set might be used to transmit a message to a secondary station, (b) the primary station setting a characteristic of the first channel to a first value. (c) the primary station changing the characteristic of the first channel to a second value upon detection of a capacity event in the search spaces.

9 Claims, 2 Drawing Sheets

(56) References Cited

OTHER PUBLICATIONS

Philips et al: "Configuration of PDCCH Blind Decoding Sets"; 3GPP TSG RAN WG1 Meeting #52, R1-080819, Feb. 11-15, 2008, Sorrento, Italy, 2 Page Document.

Philips: "Analysis of Search Space Design for PDCCH Blind Decoding"; 3GPP TSG RAN WG1 Meeting #52bis, R1-081504, Mar. 31-Apr. 4, 2008, Shenzhen, China, 5 Page Document.

* cited by examiner

METHOD FOR COMMUNICATING IN A MOBILE NETWORK

FIELD OF THE INVENTION

The present invention relates to a method for communicating in a network. More specifically, the present invention relates to communication between a primary station and a secondary station, in a telecommunication network, like a cellular telecommunication network (e.g. UMTS, UMTS LTE, GSM).

BACKGROUND OF THE INVENTION

In a mobile network, as e.g. UMTS LTE, the downlink control channel PDCCH (Physical Downlink Control Channel) carries information such as resource allocation for uplink or downlink transmission. A PDCCH message can use 1, 2, 4 or 8 Channel Control Elements (CCEs or resource elements)—referred to as CCE aggregation levels 1, 2, 4 or 8.

A mobile station, like a UE in LTE, does not know in advance the location in CCE space of messages intended for it. In principle, the mobile station could attempt to blindly decode all the possible PDCCHs with different starting positions in the CCE space and thus receive any messages intended for that mobile station. However, if the CCE space is large the processing complexity is prohibitive. Therefore a more limited search is configured which consists of a number of search spaces.

A search space is a set of aggregated CCEs (with a certain aggregation level) within which a mobile station (or user equipment (UE) or secondary station) performs blind decoding of all PDCCH payloads possible for that aggregation level. Search spaces are defined per aggregation level; a secondary station thus can have up to four search spaces. For example, the search space of a UE for aggregation level 1 (referred to as 1-CCE) could consist of the CCEs indexed 3, 4, 5, 6, 7, 8, while its search space for aggregation level 8 could consist of the two resource sets of aggregated CCEs consisting of the CCEs indexed by 1, 2, . . . 8 and 9, 10, . . . , 16, respectively. In this example, the UE thus performs six blind decodings for 1-CCEs and two blind decodings for 8-CCEs.

The LTE specification currently requires the UE to perform the following:

6 decoding attempts of 1-CCE aggregation
6 decoding attempts of 2-CCE aggregation
2 decoding attempts of 4-CCE aggregation
2 decoding attempts of 8-CCE aggregation The larger aggregations are intended to be used for large messages, and/or small messages when a lower code rate is required, for example under bad channel conditions. However, restricting the search spaces to reduce processing complexity limits the availability of suitable aggregations for different conditions as conditions vary.

However, it may occur that a plurality of User Equipments have identical search spaces. This may result in a blocking of the control channel if the primary station intends to send messages to all of these secondary stations. Moreover, in some variations of this signalling scheme, it has been proposed the allocate search space hopping in accordance with a predetermined sequence. This gives different hopping sequences for different User Equipments but does not provide for different search spaces on different component carriers. Therefore any UEs with the same search space on one carrier are likely to also have the same search space on the other carriers also. This means that if a control channel on one carrier is blocked, it is also likely to be blocked on another carrier.

A further aspect of the problem is that the current specification is designed to support the case of a large number of active UEs with moderate data rates. With a smaller search space it would have a relatively high blocking probability even for the case of a small number of active UEs with high data rates. The search spaces for different aggregation levels may overlap, which means that it would not always be possible to avoid blocking by choosing a different aggregation level for a given secondary station, especially in case of high traffic load.

Solving some or all of these problems would help in improved design of the search space(s) for multiple carriers. It could also lead to improved design (e.g. reduced blind decoding load or lower blocking probability) for the case of a single carrier.

SUMMARY OF THE INVENTION

It is an object of the invention to propose a method of communication which alleviates the above mentioned problem.

It is another object of the invention to provide a method enabling the search space to be adapted to the situation, without causing more signalling or overhead.

It is still another object of the invention to provide a method reducing the risk of blocking of the control channel.

To this end, in accordance with the invention, a method is proposed for communicating between a primary station and a plurality of secondary stations, comprising (a) the primary station configuring a secondary station to search on a first channel at least one of a plurality of search spaces having a first structure, said first structure consisting of at least a first number of resource sets, where at least one resource set might be used to transmit a message to a secondary station, (b) the primary station setting a characteristic of the first channel to a first value.

(c) the primary station changing the characteristic of the first channel to a second value upon detection of a capacity event in the search spaces.

In accordance with a second aspect of the invention, it is proposed a secondary station comprising means for communicating with a primary station, said secondary station comprising control means for activating searching on a first channel at least one of a plurality of search spaces having a first structure, said first structure consisting of at least a first number of resource sets, where at least one resource set might be used to transmit a message to a secondary station, wherein the control means are arranged for changing a characteristic of the first channel from a first value to a second value upon detection of a capacity event in the search spaces.

In accordance with still another aspect of the invention, it is proposed a primary station comprising means for communicating with at least one secondary station, comprising configuring means for configuring a secondary station to search on a first channel at least one of a plurality of search spaces having a first structure, said first structure consisting of at least a first number of resource sets, where at least one resource set might be used to transmit a message to a secondary station, and wherein the configuring means are arranged for changing a characteristic of the first channel from a first value to a second value upon detection of a capacity event in the search spaces.

As a consequence, the primary station is able to prevent a blocking of the control channel. In a particular embodiment, the primary station increases the number of OFDM symbols allocated to the control channel. This leads to a change of the search spaces of the secondary stations, being dependent of the number of OFDM symbols, and thus enables to avoid a blocking. Even if this causes some waste of resources, since some OFDM will not be used for transmissions, a blocking of a control channel would cause more disturbances for the communication and the Quality of Service.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a method for communicating in a network, like a cellular network. For instance, the network may be a UMTS network as depicted on FIG. 1.

Figure 1:
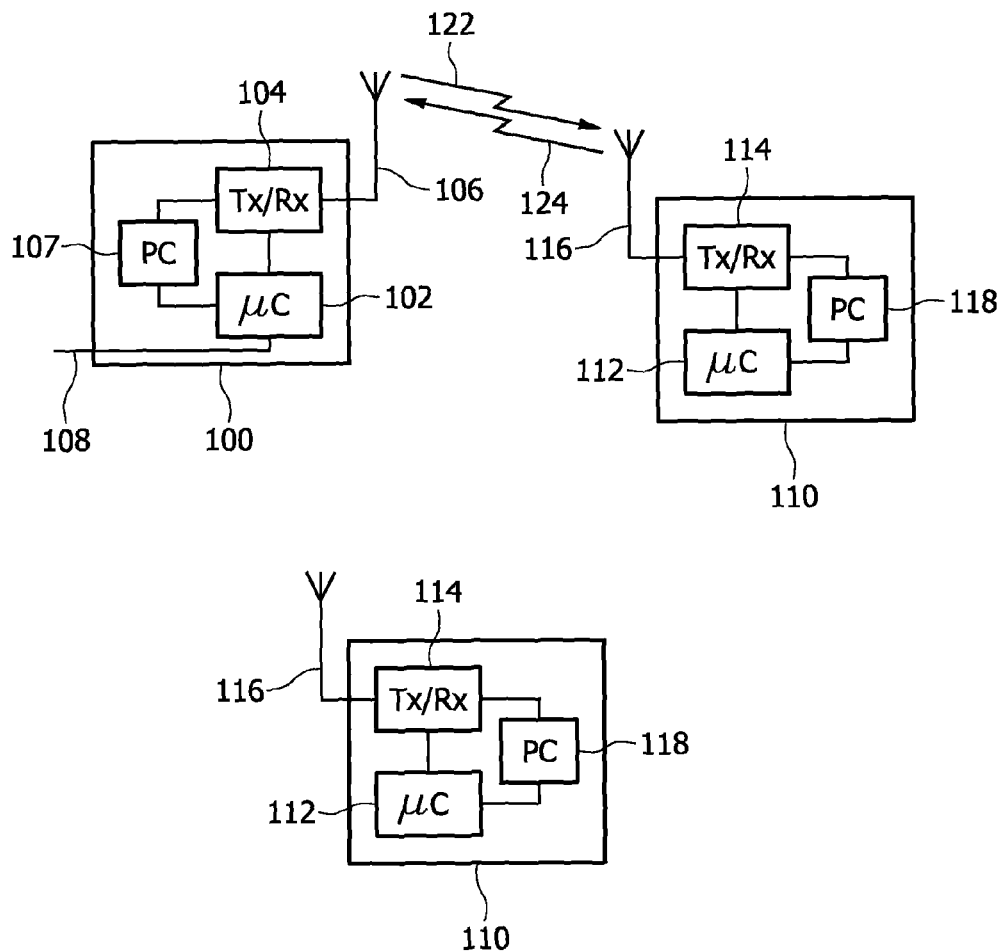
FIG. 1 is a block diagram of a network in which is implemented the first embodiment of the invention.

Referring to FIG. 1, a radio communication system in accordance with the invention comprises a primary station (BS or eNodeB) 100 and a plurality of secondary stations (MS or UE) 110. The primary station 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each UE 110 comprises a microcontroller (μC) 112, transceiver means (Tx/Rx) 114 connected to antenna means 116, and power control means (PC) 118 for altering the transmitted power level. Communication from primary station 100 to mobile station 110 takes place on downlink channels, while communication from secondary station 110 to primary station 100 takes place on uplink channels. In this example, the downlink channels comprise control channels, like PDCCH. Such control channels may be transmitted over a plurality of carriers. These carriers may be defined by frequency carriers or in a variant of the invention, coding modulation.

The first embodiment of the invention provides an efficient scheme to avoid the blocking of control channels like PDCCH which may be transmitted on multiple carriers for a communication system such as LTE or LTE Advanced.

In fact, in the first release of the LTE specifications (Rel-8), a single carrier of up to 20 MHz is used. A control signalling message on the Physical Downlink Control Channel (PDCCH) is used to signal allocations of transmission resources. Each User Equipment is configured with a search space within which to search for such signalling messages, in order to avoid having to decode every possible location in every subframe, which would result in a very large blind decoding overhead. However, in future extensions of LTE to multiple carriers, signalling will be needed to indicate resource allocations on each of the component carriers. It is desirable to avoid a significant increase in the number of blind decodes required. The current main option considered in 3GPP is to have separate PDCCHs for each Component Carrier (CC) where either:

One PDCCH indicates an allocation on the same CC or
One PDCCH indicates an allocation on the same or a different CC It is therefore beneficial in either case for there to be a search space for PDCCH messages on each carrier (i.e. a set of possible locations for a PDCCH in each of which the UE attempts to decode a PDCCH (i.e. blind decoding).

However, the further details are not defined.

In general, it would be desirable for the UE to be able to receive a PDCCH on any of the CCs (and typically more than one PDCCH at the same time).

In order to avoid too great an increase in signal processing due to the total number of blind decodes, the search space on each carrier should be kept as small as possible.

Currently in Release 8, the position of the UE-specific search space for PDCCH for a given UE changes from subframe to subframe according to the following in TS36.213:

"The set of PDCCH candidates to monitor are defined in terms of search spaces, where a search space $S_k^{(L)}$ at aggregation level $L \in \{1, 2, 4, 8\}$ is defined by a set of PDCCH candidates. The CCEs corresponding to PDCCH candidate m of the search space $S_k^{(L)}$ are given by $$L \cdot \{(Y_k + m) \bmod \lfloor N_{CCE,k}/L \rfloor\} + i$$

where $Y_k$ is defined below, $i=0, \ldots, L-1$ and $m=0, \ldots M^{(L)}-1$. $M^{(L)}$ is the number of PDCCH candidates to monitor in the given search space.

For the UE-specific search space $S_k^{(L)}$ at aggregation level L, the variable $Y_k$ is defined by $$Y_k = (A \cdot Y_{k-1}) \bmod D$$

where $Y_{-1} = n_{RNTI} \neq 0$, $A=39827$, $D=65537$ and $k = \lfloor n_s/2 \rfloor$, $n_s$ is the slot number within a radio frame. The RNTI value used for $n_{RNTI}$ is defined in section 7.1 in downlink and section 8 in uplink."

The RNTI value is specific to the UE, and the aggregation level is 1, 2, 4 or 8.

There is also a Common search space (starting at CCE zero) intended for broadcast control messages to a number of UEs.

More details of the search spaces are given in the Table below showing the PDCCH candidates monitored by a UE in Release 8. Search space $S_k^{(L)}$

| Type | Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

If the UE-specific search space per carrier is reduced (as is likely to be required for the case of multiple carriers), then there is a significant probability that it will collide with either a part of the common search space or the search space of another UE. This may lead to blocking of the control channel, preventing the eNB scheduling the desired DL and/or UL transmissions and thus a loss of performance (e.g. throughput or QoS). A possible set of search spaces for additional carriers is given in the table below (on the assumption that there is no common search space on additional carriers) and which shows the possible PDCCH candidates monitored by a UE (Release 10, additional carriers only).

| Search space $S_k^{(L)}$ | | | Number of PDCCH |
|---|---|---|---|
| Type | Aggregation level L | Size [in CCEs] | candidates $M^{(L)}$ |
| UE-specific | 1 | 2 | 2 |
| | 2 | 4 | 2 |
| | 4 | 8 | 2 |
| | 8 | 16 | 2 |

This method of search space hopping currently specified gives different hopping sequences for different UEs but does not provide for different search spaces on different component carriers. Therefore any UEs with the same search space on one carrier would also have the same search space on the other carriers also. This means that if a control channel on one carrier is blocked, it is also likely to be blocked on another carrier.

A further aspect of the problem is that the current specification is designed to support the case of a large number of active UEs with moderate data rates. With a smaller search space it would have a relatively high blocking probability even for the case of a small number of active UEs with high data rates. The search spaces for different aggregation levels may overlap, which means that it would not always be possible to avoid blocking by choosing a different aggregation level for a given UE. Solving some or all of these problems would help in improved design of the search space(s) for multiple carriers. It could also lead to improved design (e.g. reduced blind decoding load or lower blocking probability) for the case of a single carrier.

Some possible solutions have been identified by the applicants:

The use of larger search spaces. However, this would increase processing due to increase in blind decoding (whereas aim is to reduce the amount of blind decoding).

Making the PDCCH location on CCs depend on the PDCCH location on the anchor carrier. For example the PDCCH location on a CC could be the same as that used on the anchor carrier. A disadvantage is that there must be a PDCCH sent (and detected) on the anchor carrier. This solution has already been proposed in 3GPP by other companies.

The solution described in the first embodiment is based on the recognition that, in a blocking scenario the primary station could use a different number of OFDM symbols for control. This is not prevented by the current specification, but would not be necessary in Release 8. Since the number of CCEs is not exactly proportional to the number of OFDM symbols, the "mod" operation will typically generate different locations for the search space for different numbers of OFDM symbols. It is of importance to determine what is the trigger for the primary station to use a different number of OFDM carriers, e.g. an estimation that blocking would yield higher data rate loss than a simple reduction in resources due to a larger allocation for control channel signalling. This solution is considered of most interest in terms of complexity and performance benefit.

Configured search space per UE: For example the search space on additional component carriers could be fixed for each UE (e.g. by RRC signalling). This could be applied to one or more aggregation levels. If a value is not configured, then hopping could be applied as a default. As a more general case a UE-specific hopping region could be configured. A simplification would be to derive a UE-specific location directly from the UE ID, but this could lead to permanent blocking between pairs of UEs with particular IDs. This could be avoided by explicitly instructing the UE to use hopping parameters that do not necessarily depend on UE ID. This solution, as the previous one, is considered of interest in terms of complexity and performance benefit. These two solutions may be used independently or combined.

Always Non-overlapping locations for search spaces with different aggregation levels: If the aggregation level preferred by the eNB was blocked a different aggregation level could be used. In some cases the search spaces for different aggregation levels overlap. Enforcing non-overlap would therefore facilitate the use of a different aggregation level. This mitigates the blocking problem, at the cost of a small additional overhead. A possible modification to the search space would be $$L \cdot \left\{ (Y_k + m + \mathit{Off}_L) \bmod \left\lfloor \frac{N_{CCE,k}}{6} \right\rfloor \right\} + i$$

where $\mathit{Off}_L$ is an offset applied to the search space for a particular aggregation level to try and ensure that they do not overlap (or do not overlap with search spaces of neighbouring aggregation levels which might be used as an alternative). The offset values could be fixed in the specification, or signalled. If signalled, they could be different in different CCs.

A modified hopping sequence to avoid common search space: If the UE specific search space falls inside the common search space (or a defined region), then a different location is used, from a pseudo-random sequence, a fixed location (which may be UE specific), or a search space location on another carrier.

In accordance with the first embodiment, in a system like LTE illustrated on FIG. 1, to save processing power, each secondary station 110 monitors only a limited set of PDCCH locations on a given carrier. These locations may be defined as a function of the secondary station ID, the subframe number, the size of message, and the amount of resource available for control channel signalling for example. Other parameters could be added in the determination of the search space. Similarly, one or the other of the above listed parameters could not be taken into account in the determination of the search space. The network (e.g. the primary station 100 or eNB) has the choice of changing the value of the characteristic of the control channel. In an example of the first embodiment, the primary station uses a different amount of resource by setting a different numbers of OFDM symbols for control channel signalling. In the interests of efficient use of radio resources the eNB would choose the smallest possible number of OFDM symbols for the number of PDCCH messages it needs to send. However, it may be the case that some of the desired messages cannot be sent because of the restricted number of PDCCH locations monitored by the UEs, for example such that multiple UEs would expecting a PDCCH in the same location (leading to blocking of the control channel). In such a case, according to the invention, the number of OFDM symbols for control would be changed (i.e. increased), giving a different set of search spaces, which would be very likely to avoid the blocking problem.

Figure 2:
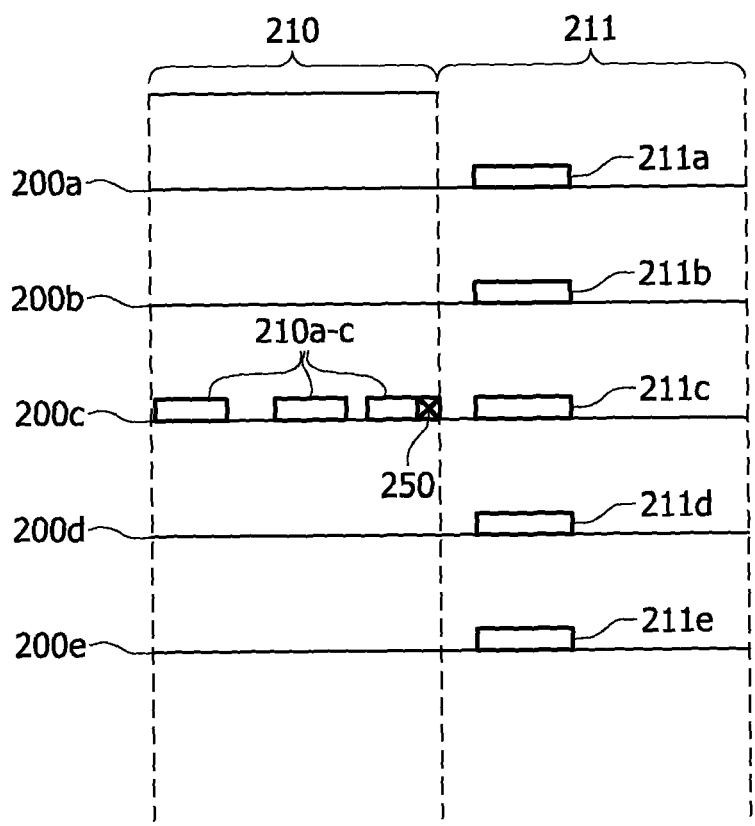
FIG. 2 is a time chart of the search spaces of a system in accordance with a first embodiment of the invention.

This is for example illustrated on FIG. 2, where an example of this embodiment is depicted. In this example, a plurality of component carriers 200a to 200e which may be used for transmission of PDCCH are illustrated, the anchor component carrier being component carrier 200c. As illustrated on FIG. 2, the component carriers are divided in several phases 210 and 211 corresponding to two different value of the control channel characteristic. Here, two different values are defined.

In phase 210, the control channel characteristic, for instance the number of OFDM symbols dedicated to the control channel, equals a first value, and a first set of search spaces 210a-c is dedicated to a plurality of mobile terminals in successive time intervals. These search spaces may be on a limited number of component carriers, here only on the anchor component carrier 200c.

The instant referenced 250 marks the detection by the primary station 100 of a capacity event on the control channel. This capacity event may be a reduction of the reachable data rate, or any traffic related conditions. In an advantageous example, this capacity event is the detection by the primary station of a blocking of the control channel. This occurs when messages are intended to a plurality of secondary that share the same search spaces, and the size of the overall messages is greater than the amount of resources contained in the search spaces. This would lead to selecting some secondary stations before the others and may result in a drop of the quality of service.

In order to avoid such a blocking of the control channel, the primary station changed a value of a characteristic of the control channel. In the example, the characteristic is the number of OFDM symbols allocated to the control channel which is increased from phase 210 to phase 211. The consequence of this value change is the modification of the search spaces the secondary station. As illustrated in FIG. 2, the search space of the secondary station is amended so that it increases the number of free resources that can be used for transmitting a control message.

A second embodiment of the invention comprises a control channel having multiple component carriers in the uplink (UL) and downlink (DL). Resources on a given DL carrier are indicated using a PDCCH on that carrier. Resources on a given UL carrier are indicated by a PDCCH on a corresponding DL carrier. As a variation an additional field is included in the PDCCH to indicate that the resources are on a different carrier from the one used for sending the PDCCH. This also allows for the possibility that there is not a one-to-one correspondence between UL and DL carriers. The search spaces on one carrier (anchor carrier) are the same as for LTE Release 8. Some search spaces on the other carriers are smaller, such that only two PDDCH locations are monitored on each carrier for each aggregation level.

An extension to either the first or second embodiment described above is particularly suitable for a scenario with a small number of UEs with high data rate requirements. To avoid control channel blocking between particular UEs (and to avoid the common search space), at least one UEs is configured to use at least one fixed search space on at least one carrier. As an example a UE is configured by higher layer signalling to use a particular fixed value of Yk for aggregation level 2 in any subframe and on all the carriers except the anchor carrier. A second UE would be configured with a different value fixed value of $Y_k$ (chosen to give a non-overlapping search space).

The described embodiments were described with a plurality of component carriers, since it is particularly suitable for such systems. However, it is to be noted that it could be applied with a single carrier.

The invention may be applicable to mobile telecommunication systems like UMTS LTE and UMTS LTE-Advanced, but also in some variants to any communication system having allocation of resources to be done dynamically or at least semi persistently.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for communicating between a primary station and a plurality of secondary stations, comprising
    (a) the primary station configuring a secondary station to search on a first channel at least one of a plurality of search spaces having a first structure and a first location, said first structure consisting of at least a first plurality of resource sets on different component carriers, where at least one resource set is used to transmit a message to the secondary station, said first location defined as a function of the secondary station ID, a sub-frame number, a size of the message, and an amount of resource available for control channel signaling,
    (b) the primary station setting a characteristic of the first channel to a first value, wherein the characteristic is the number of OFDM symbols dedicated to the first channel, and
    (c) the primary station changing the characteristic of the first channel to a second value upon detection of a capacity event in the search spaces, and configuring at least one secondary station to search a search space fixed over the frames, wherein the search space structure of the secondary stations is varied from frame to frame in accordance with a predetermined sequence.

2. The method of claim 1, wherein the capacity event comprises the primary station scheduling transmission of a set of messages to a subset of the plurality of secondary stations sharing at least part of the search space, and wherein the resources included in the search spaces of the subset of secondary stations is below the resources required for the transmission of the set of messages, when using the first value of the characteristic of the first channel.

3. The method of claim 1, wherein step (c) comprises the primary station increasing the number of resources dedicated to the first channel.

4. The method of claim 3, wherein the first channel is an OFDM channel, and wherein step (c) comprises the primary station increasing the number of OFDM symbols dedicated to the first channel.

5. The method of claim 4, wherein the search spaces are configured so that step (c) results in changing the search spaces of at least one of the plurality of secondary stations.

6. The method of claim 4, wherein the structure of a search space dedicated to a secondary station depends on the number of OFDM symbols dedicated to the first channel.

7. The method of claim 1, wherein the message is a signalling message from the primary station.

8. The method of claim 1, wherein the second value is signalled by the primary station.

9. A radio communication system comprising a primary station and a plurality of secondary stations, the communication system comprising:
    the primary station adapted to configure a secondary station to search on a first channel at least one of a plurality of search spaces having a first structure and a first location, said first structure consisting of at least a first plurality of resource sets on different component carriers, where at least one resource set is used to transmit a message to the secondary station, said first location defined as a function of the secondary station ID, a sub-frame number, a size of the message, and an amount of resource available for control channel signaling, the primary station adapted to set a characteristic of the first channel to a first value, wherein the characteristic is the number of OFDM symbols dedicated to the first channel, and the primary station adapted to change the characteristic of the first channel to a second value upon detection of a capacity event in the search spaces, the primary station adapted to configure at least one secondary station to search a search space fixed over the frames, wherein the search space structure of the secondary stations is varied from frame to frame in accordance with a predetermined sequence, and the secondary station adapted to activate searching on the first channel at least one of the plurality of search spaces having said first structure and said first location.

* * * * *